US007299316B2

(12) United States Patent
Chou et al.

(10) Patent No.: US 7,299,316 B2
(45) Date of Patent: *Nov. 20, 2007

(54) MEMORY FLASH CARD READER EMPLOYING AN INDEXING SCHEME

(75) Inventors: Horng-Yee Chou, Palo Alto, CA (US); Edward W. Lee, Mountain View, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/956,826

(22) Filed: Oct. 1, 2004

(65) Prior Publication Data

US 2005/0193162 A1     Sep. 1, 2005

Related U.S. Application Data

(63) Continuation-in-part of application No. 10/789,333, filed on Feb. 26, 2004, now abandoned.

(51) Int. Cl.
*G06F 13/00*      (2006.01)
*G06F 12/00*      (2006.01)

(52) U.S. Cl. .................. 711/103; 711/115; 711/159; 711/170

(58) Field of Classification Search ............ 711/103, 711/115, 159, 170, 109; 710/305
See application file for complete search history.

(56) References Cited

U.S. PATENT DOCUMENTS

| | | | |
|---|---|---|---|
| 2002/0036922 A1* | 3/2002 | Roohparvar | 365/185.11 |
| 2003/0093606 A1* | 5/2003 | Mambakkam et al. | 710/305 |
| 2003/0177300 A1* | 9/2003 | Lee et al. | 711/103 |
| 2004/0243749 A1* | 12/2004 | Learmonth | 710/73 |
| 2005/0083741 A1* | 4/2005 | Chang et al. | 365/200 |
| 2005/0114587 A1* | 5/2005 | Chou et al. | 711/103 |
| 2005/0144360 A1* | 6/2005 | Bennett et al. | 711/103 |
| 2005/0182858 A1* | 8/2005 | Lo et al. | 710/1 |
| 2005/0193161 A1* | 9/2005 | Lee et al. | 711/103 |
| 2005/0193162 A1* | 9/2005 | Chou et al. | 711/103 |
| 2005/0216624 A1* | 9/2005 | Deng et al. | 710/74 |

OTHER PUBLICATIONS

Standard Microsystems Corporation, USB97C242, USB 2.0 Flash Driver Controller Data Sheet, Oct. 2002, pp. 1-22.*

* cited by examiner

*Primary Examiner*—Hong Kim
(74) *Attorney, Agent, or Firm*—Schein & Cai LLP; Douglas Mackenzie; James Cai

(57) ABSTRACT

A memory flash card reader includes a processor for receiving at least one request from a host system, an index comprising information regarding sectors of the memory flash card wherein the processor may utilize the index to determine sectors of the memory flash card that are available for programming, reprogramming, or reading, and at least one card controller coupled to the processor.

32 Claims, 18 Drawing Sheets

MEMORY FLASH CARD READER EMPLOYING AN INDEXING SCHEME

CROSS REFERENCE TO RELATED APPLICATIONS

The present application is a continuation in part of application Ser. No. 10/789,333, entitled "System and Method for Controlling Flash Memory", filed on Feb. 26, 2004, now abandoned, the disclosure of which is herein incorporated by reference in its entirety.

BACKGROUND OF THE INVENTION

The present invention relates generally to memory systems and more particularly to a system and method for providing a USB flash memory card reader capable of reading a plurality of flash memory card formats.

As flash memory technology becomes more advanced, flash memory is replacing traditional magnetic hard disks as storage media for mobile systems. Flash memory has significant advantages over magnetic hard disks such as having high-G resistance and low power dissipation. Because of the smaller physical sizes of flash memory, they are also more conducive to mobile systems. Accordingly, the flash memory trend has been growing because of its compatibility with mobile systems and its low-power feature.

New generation personal computer (PC) card technologies have been developed that combine flash memory with architecture that is compatible with the Universal Serial Bus (USB) standard. This has further fueled the flash memory trend because the USB standard is easy to implement and is popular with PC users. In addition to replacing hard drives, flash memory is also replacing floppy disks because flash memory provides higher storage capacity and faster access speeds than floppy drives.

However, the USB standard has several features that require additional processing resources. These features include fixed-frame times, transaction packets, and enumeration processes. For better optimization, these features have been implemented in application-specific integrated circuits (ASICs).

In addition to the limitations introduced by the USB standard, there are inherent limitations with flash memory. First, flash memory sectors that have already been programmed must be erased before being reprogrammed. Also, flash memory sectors have a limited life span; i.e., they can be erased only a limited number of times before failure. Accordingly, flash memory access is slow due to the erase-before-write nature and ongoing erasing will damage the flash memory sectors over time.

Hardware and firmware utilize existing small computer systems interface (SCSI) protocols so that flash memory can function as mass-storage devices similar to magnetic hard disks. SCSI protocols have been used in USB-standard mass-storage devices long before flash memory devices have been widely adopted as storage media. Accordingly, the application extensions of the USB standard have incorporated traditional SCSI protocols.

A prior art solution provides a driver procedure for flash memory write transactions. This procedure has three different sub-procedures. Generally, the data of a requested flash memory address is first read. If there is data already written to that address, the firmware executes an erase command. Then, if the erase command executes correctly, the firmware executes a write request. However, this driver procedure utilizes protocols that require additional computing resources at the host system. It is also slow.

Disadvantages of many of the above-described and other known arrangements include additional host system resources required to process special protocols and the resulting added processing time required for managing flash memory.

Accordingly, there is a need for a USB flash memory card reader capable of reading a plurality of flash memory card formats which incorporates an improved system and method for controlling the flash memory card. The USB flash memory card reader preferably complies with the USB standard, is suitable for ASIC hardware implementation, and is fast, simple, cost effective and capable of being easily adapted to existing silicon technology. The present invention addresses such a need.

SUMMARY OF THE INVENTION

In accordance with one aspect of the invention, a memory flash card reader includes a processor for receiving at least one request from a host system, an index comprising information regarding sectors of the memory flash card wherein the processor may utilize the index to determine sectors of the memory flash card that are available for programming, reprogramming, or reading, and at least one card controller coupled to the processor.

In another aspect of the invention, a method of managing a flash memory includes the steps of receiving at least one request from a host system in a processor within a flash memory controller, determining which sectors of the flash memory are available for writing, erasing and reading utilizing the processor and an index coupled to the processor, and writing, erasing and reading to a flash memory card through at least one card controller coupled to the processor.

These and other feature, aspects, and advantages of the present invention will become better understood with reference to the following drawings, description, and claims.

DETAILED DESCRIPTION OF THE INVENTION

The following detailed description is of the best mode of carrying out the invention. The description is not to be taken in a limiting sense, but is made merely for the purposes of illustrating the general principles of the invention, since the scope of the invention is best defined by the appended claims.

Figure 1:
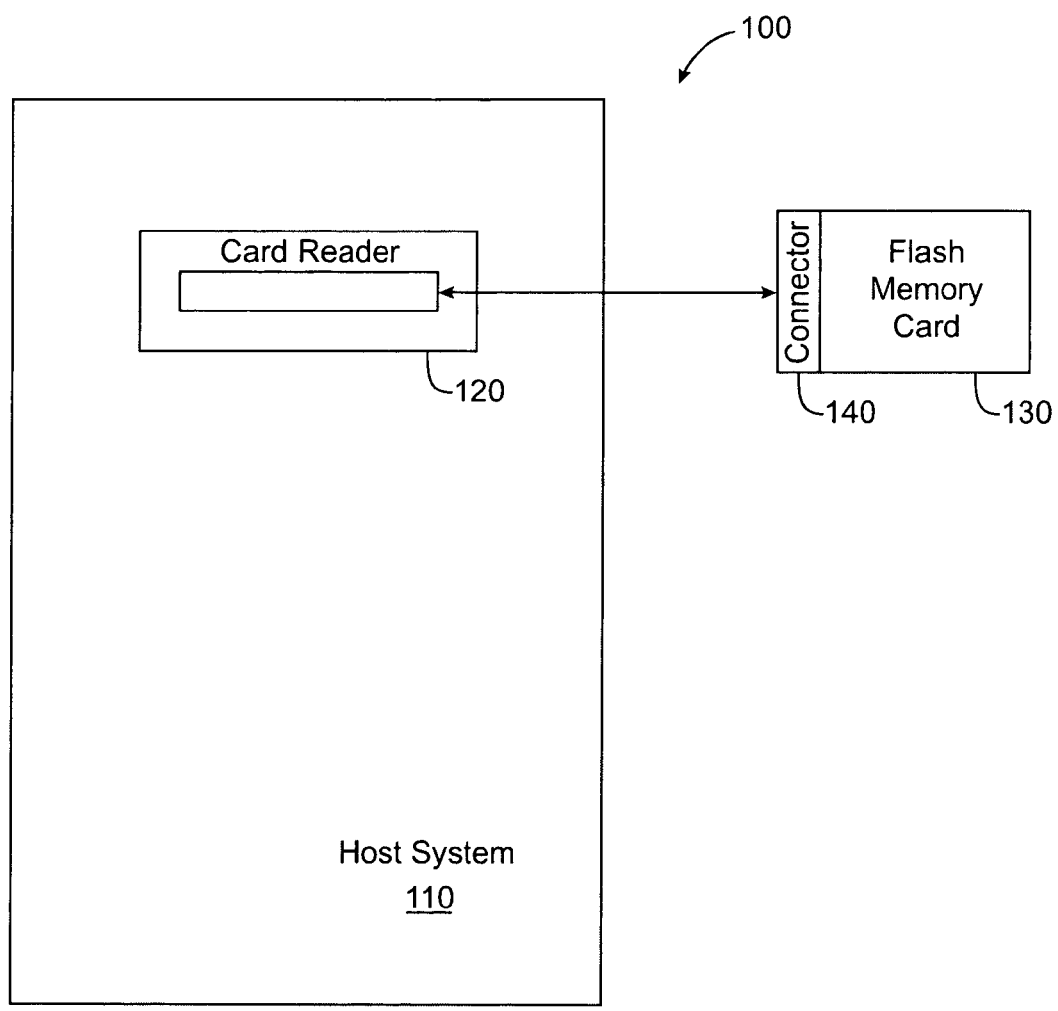
FIG. 1 is a schematic representation showing a memory card coupleable to a host computer in accordance with the invention.

In a first aspect of the invention, and with reference to FIG. 1, there is shown a card reader system generally designated 100 including a first portion 120 which may be disposed within a host system 110 and a second portion 130 coupleable to the first portion 120. First portion 120 may include a card reader and second portion 130 may include a flash memory card. Note that the first portion 120 and the host system 110 can reside on the same printed circuit board in one specific implementation. In another implementation, they can be separate boards. First portion 120 may be coupled to the host system 110 by means of a standard interface that may provide both mechanical and electrical connection between the first portion 120 and the host system 110. The standard interface may include a conventional 3.5 inch slot, a 5.25 inch slot, or a riser card. The electrical interface between the first portion 120 and the host system 110 preferably includes the USB interface.

The second portion 130 may be removably coupled to the first portion 120 by means of second portion connector 140. The connection between the second portion 130 and the first portion 120 may include a proprietary connection, Multi Media Card (MMC), Secure Digital (SD) Card, Memory Stick (MS), Smart Media (SM), Compact Flash (CF), PCI Express, Serial Advanced Technology Attachment (SATA), Serial Attached Small Computer System Interface (SCSI), and IEEE 1394. The connection may include a MX1 (multiple in one) or a 1×1 (one in one) connection.

Figure 3:
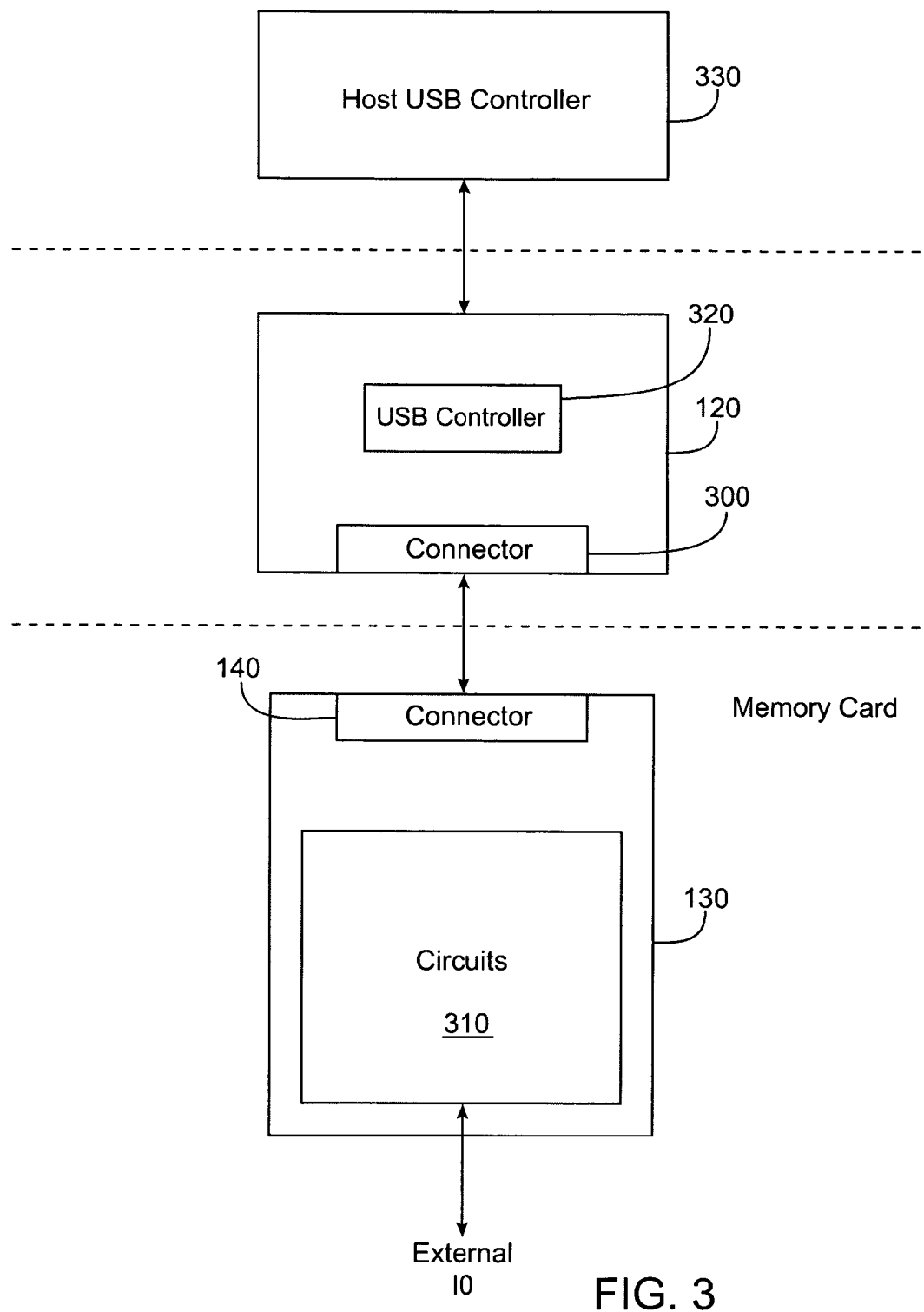
FIG. 3 is a schematic representation showing a logical representation of the configuration of FIG. 1 or 2 in accordance with the invention.

The second portion connector 140 generally includes pins that provide connections to ground, voltage supplies, serial/parallel data in and/or out, control lines, select lines, address lines, test pins as well as a signal that acknowledges the presence of the second or daughter portion 130. Depending on selective implementations of these pins, many pins or very few pins may be used in the second portion connector 140 and a first portion second connector 300 (FIG. 3). In a minimum pin implementation, data, addresses and commands are multiplexed into a serial stream before being passed across the second portion connector 140. Once across, the serial stream may be de-multiplexed into its respective components. As an example, this serial stream may be an MMC interface.

According to one aspect of the invention, a peripheral device may include flash memory chips and supporting hardware circuits that form a USB controller 320 (FIG. 3) for controlling the operations of the flash memory and for interfacing to the host system 110. The peripheral device can be partitioned such that the USB controller 320 resides on the first portion 120 and the flash memory chips reside on the second portion 130, such as defined by the XD standard. A more popular partition is to put all of the complexity onto the USB controller 320. In this case a controller on the memory card 130 only has a very simple interface control.

In this manner, a cost-effective flash memory system is provided, especially in applications where magnetic floppy disks are to be replaced. In accordance with the invention, second portion 130 may act essentially like a semiconductor flash memory "floppy disk" and may or may not have a controller on the second portion 130. The USB controller 320 on the first portion 120 may then serve any number of flash memory "floppy disks". The cost of each flash memory "floppy disk" is therefore reduced by simplifying or eliminating the controller on the "floppy disk" itself. Another advantage is an increase in system flexibility. A user may add or decrease memory capacity by choosing among second portion 130 cards with various amounts of installed memory. Also, with each update or upgrade of the USB controller 320, only the first portion 120 needs be replaced, the second portion 130 card "floppy disk" being fully usable with an updated or upgraded first portion 120.

Figure 2:
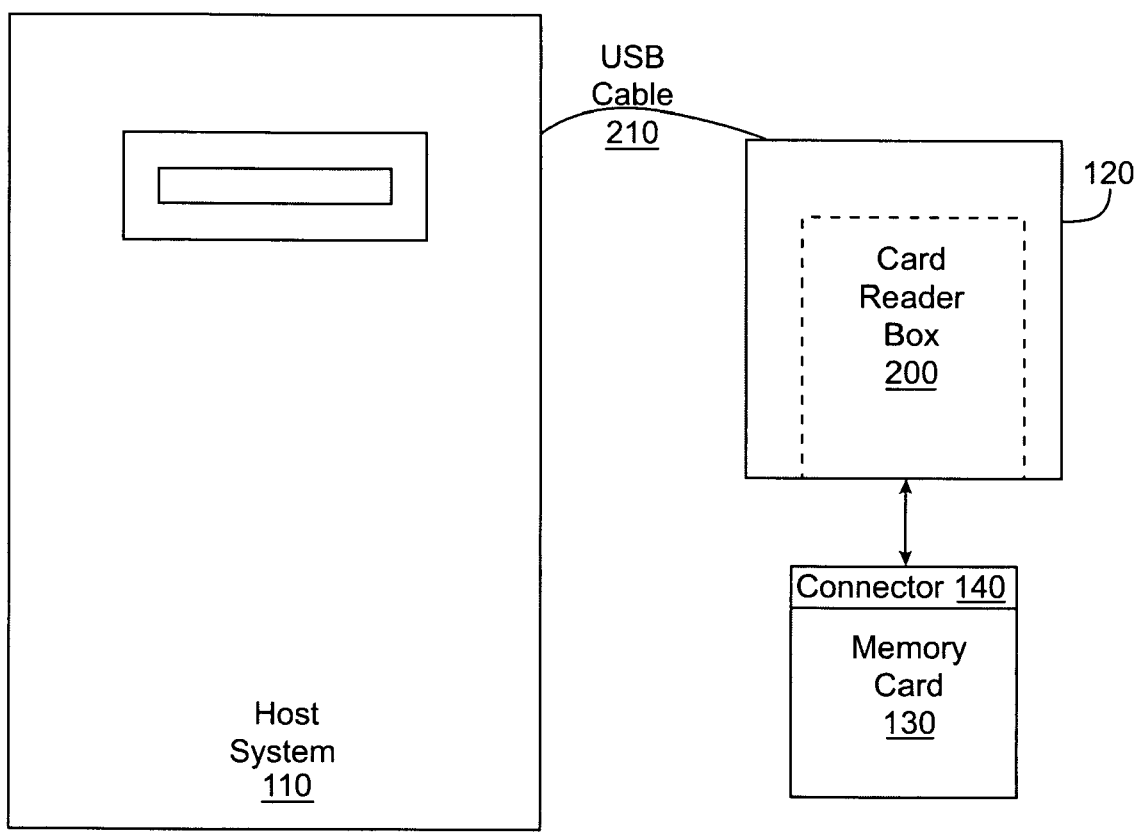
FIG. 2 is a schematic representation showing a memory card coupleable to a host computer through a card reader box in accordance with the invention.

In another aspect of the invention and with reference to FIG. 2, first portion 120 may include a USB flash memory card reader box 200 which may be coupled to the host system 110 by means of a USB cable 210. Card reader box 200 may include USB controller 320. The second portion 130 may be removably coupled to the card reader box 200 by means of second portion connector 140.

As shown in FIG. 3, a logical representation of the card reader system 100 may include the second portion 130 having circuits 310 disposed therein. Circuits 310 may include flash memory chips. USB controller 320 may be disposed in first portion 120 which may be coupled to a host USB controller 330 disposed in host system 110.

Figure 4:
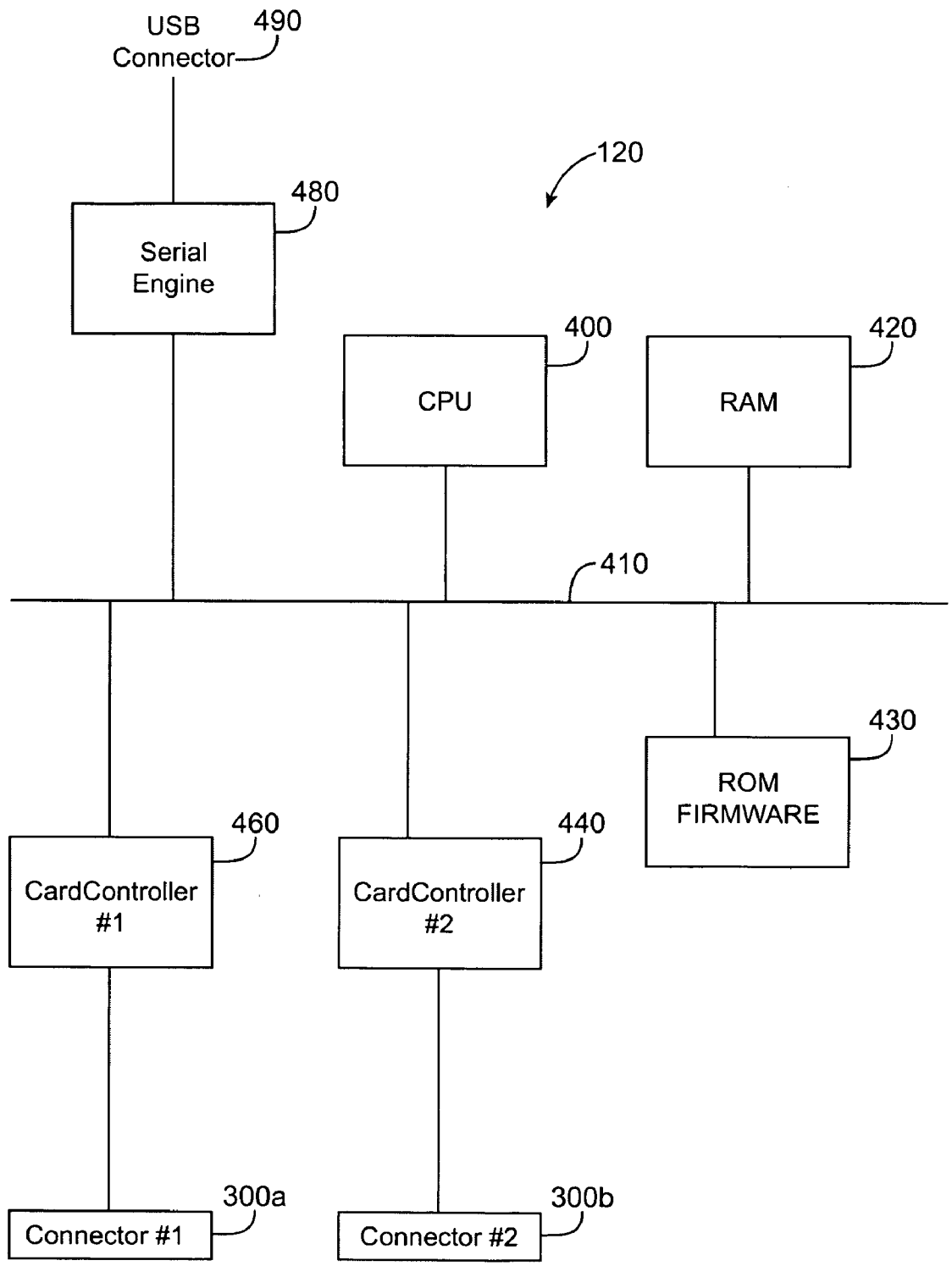
FIG. 4 is a block diagram of a first portion of a peripheral device in accordance with the invention.

First portion 120 may include a first portion processor 400 coupled to a bus 410 as shown in FIG. 4. A random access memory device 420 and a read only memory device 430 may be coupled to bus 410. A USB serial engine 480 may be coupled to bus 410 and include a USB connector 490. A pair of card controllers 440 and 460 may be coupled to bus 410 and include connectors 300a and 300b respectively. Card controllers 440 and 460 may include controllers adapted to interface with flash memory cards having different connections such as a proprietary connection, Multi Media Card (MMC), Secure Digital (SD) Card, Memory Stick (MS), Smart Media (SM), Compact Flash (CF), XD, PCI Express, Serial Advanced Technology Attachment (SATA), Serial Attached Small Computer System Interface (SCSI), and IEEE 1394. Although only two card controllers 440 and 460 are shown, those skilled in the art will appreciate that a plurality of card controllers may be coupled to bus 410.

Figure 5:
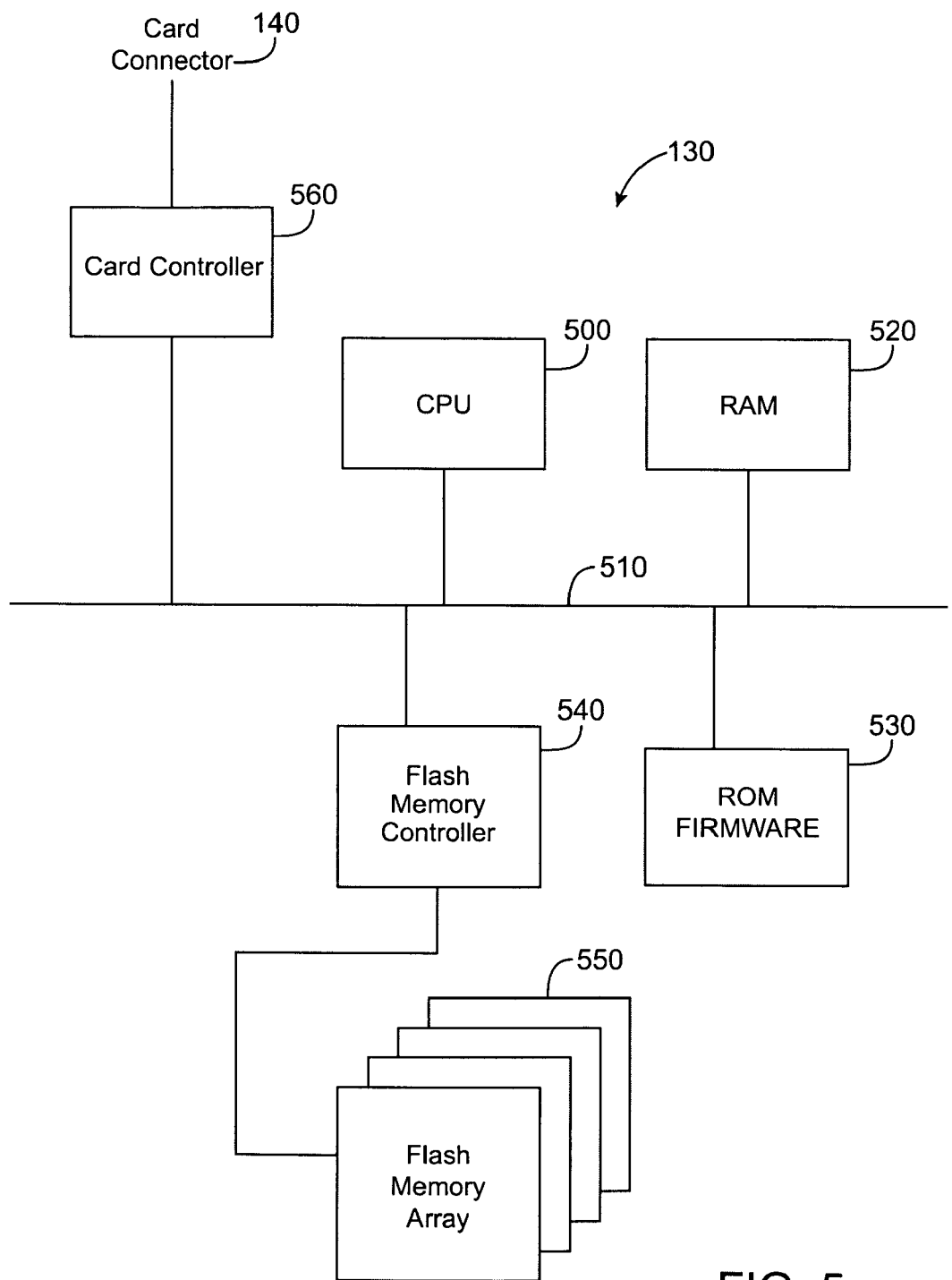
FIG. 5 is a block diagram of a second portion of a peripheral device in accordance with the invention.

Second portion 130 may include a second portion processor 500 coupled to a bus 510 as shown in FIG. 5. A random access memory device 520 and a read only memory device 530 may be coupled to bus 510. A flash memory controller 540 may be coupled to bus 510 and to a flash memory array 550. A card controller 560 may be coupled to bus 510 and to second portion connector 140.

Figure 6:
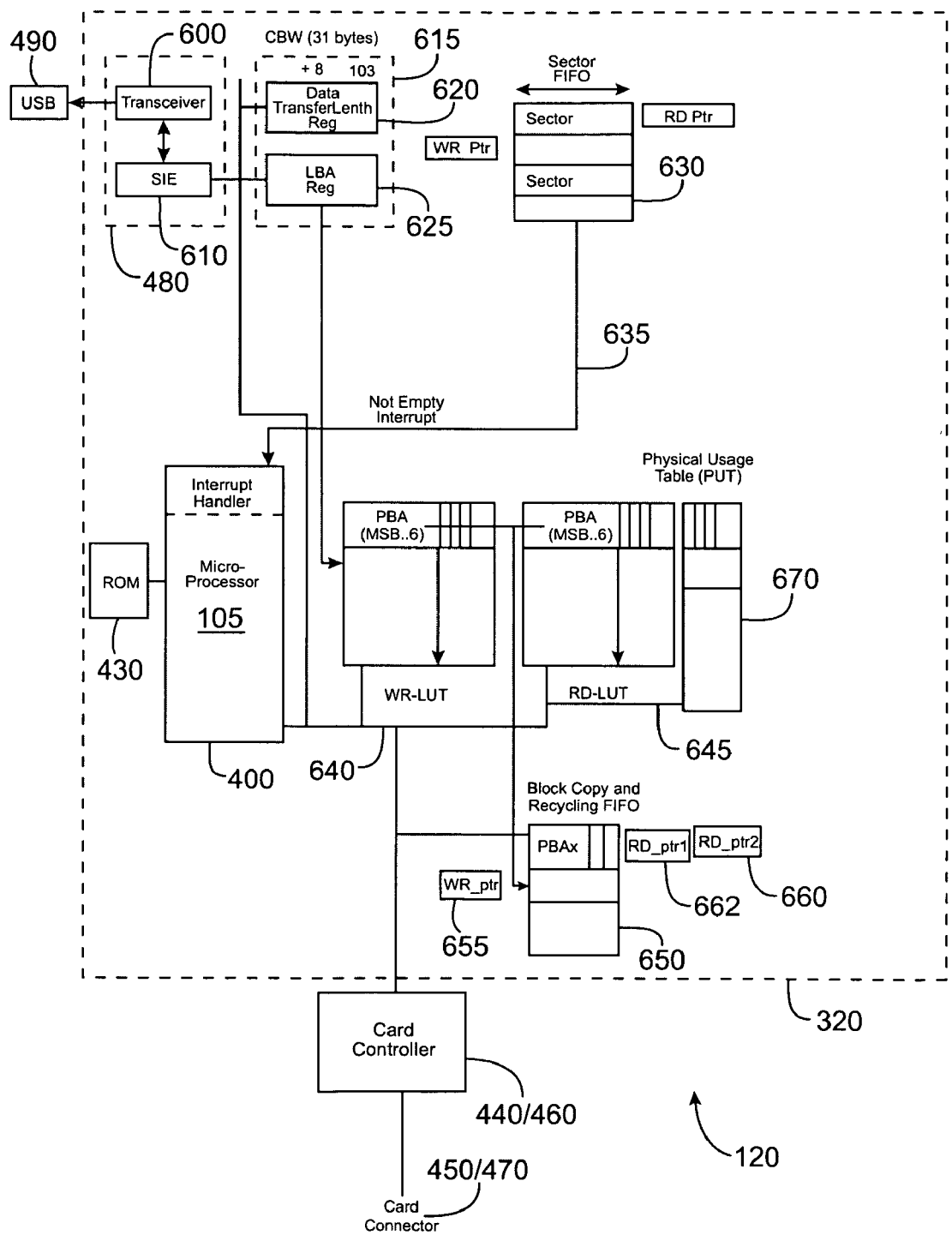
FIG. 6 is a block diagram of a preferred embodiment of the first portion in accordance with the invention.

With reference to FIG. 6, USB controller 320 may include serial engine 480 having a transceiver 600 operable to convert analog signals to digital streams and to provide a phase lock loop circuit for generating precision clocks for internal data latching. For USB 2.0, the phase lock loop functionality can be sensitive and thus useful due to its operating at 480 MHz. Serial engine 480 may also include a serial interface engine (SIE) 610 which may provide serial and parallel data conversion, packet decoding/generation, cyclic redundancy code (CRC) generation/checking, non-return-to-zero (NRZI) encoding/decoding, and bit stuffing according to the USB 2.0 standard.

A bulk-only transport unit (BOT) 615 may receive command block wrappers (CBW) and may include a data transfer length register 620 and a logical block address (LBA) register 625.

A sector FIFO 630 may be used for data buffering. A FIFO-not-empty interrupt signal 635 may trigger an interrupt service routine at an interrupt handler of processor 400. The interrupt routine responds to the host system 110 confirming that a write process has been completed. In the mean time, processor 400 may execute firmware stored in ROM 430 to take care of sector data in FIFO 630 and execute the write process.

Microprocessor 400 may be an 8-bit or a 16-bit processor. Microprocessor 400 may be operable to respond to host system 110 requests and communicate with second portion 130 through card controller 440, 460. As firmware algorithms become more complicated, tradeoffs between performance and cost may determine the proper microprocessor selected.

In order to achieve logical to physical address translation, two look up tables may be used, write look up table 640 for write access and read look up table 645 for read access. Write look up table 640 and read look up table 645 provide an index or indexing scheme to flash memory array 550. A block copy and recycling FIFO 650 may be used with a write pointer 655 and two read pointers 660 and 662 assigned for block valid sector copy and erase operations. These two functions may share one FIFO mechanism to fulfill this purpose and may run in the background.

The physical usage table 670 may be used for physical sector mapping bookkeeping and may provide a bitmap indicating programmed sectors, that is, sectors to which data has already been written. Card controllers 440 and 460 may interface with second portion 130 to carry out commands from processor 400. Card controllers 440 and 460 may receive physical block addresses (PBAs) from write and read look up tables 640 and 645 respectively to service write and read requests.

For optimal ASIC implementation, the write look up table 640, the read look up table 645, the physical usage table 670, and the recycling FIFO 650 may be implemented with volatile random access memory 420.

Figure 7:
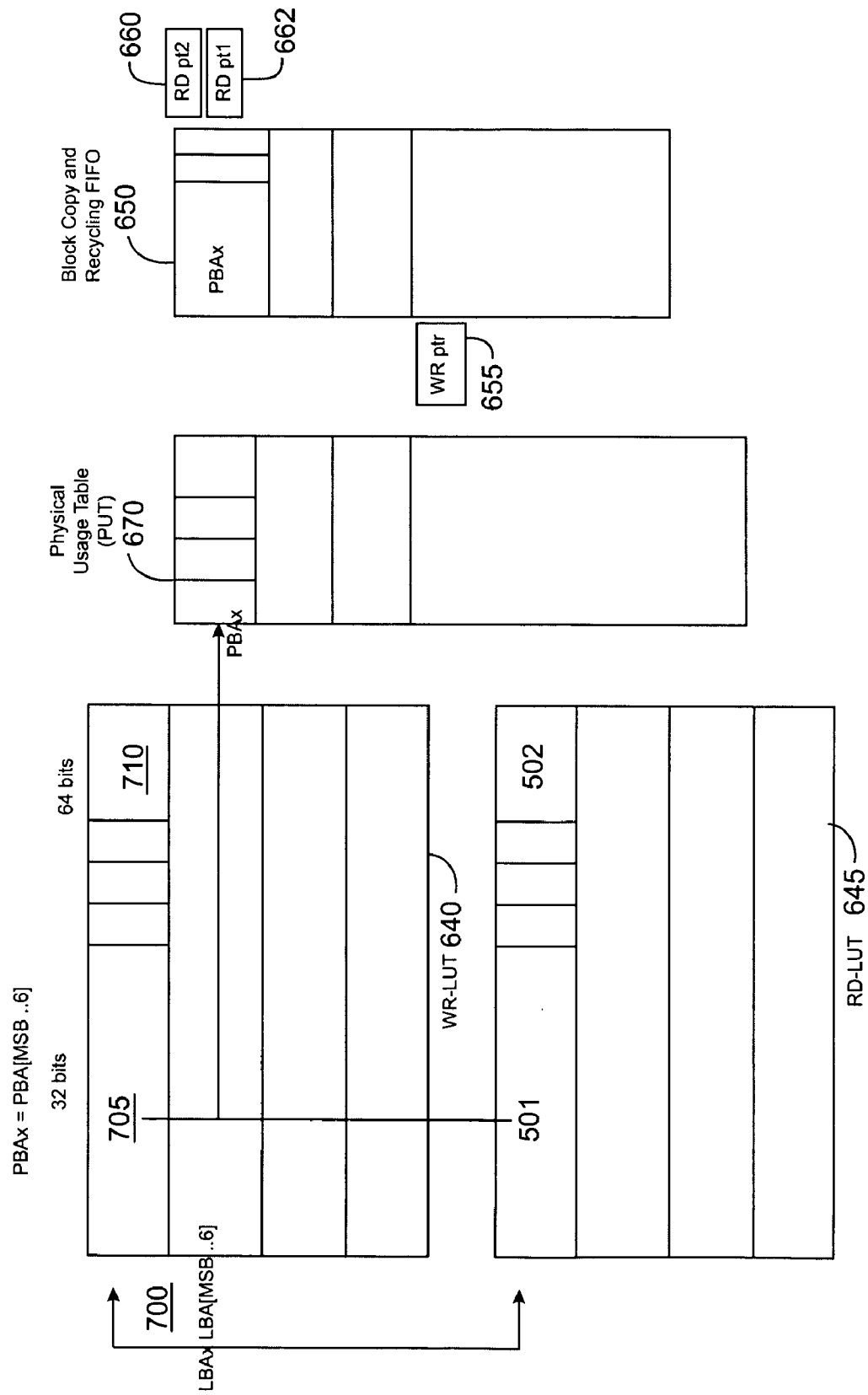
FIG. 7 is a block diagram of a logical/physical block address translation look up table, a physical usage table, and a block copy and recycling FIFO in accordance with the invention.

With reference to FIG. 7, logical block addresses (LBAs) 700 may be used to index the write look up table 640 and the read look up table 645. Block offset bits (bit0 to bit5) may not be needed as both the write look up table 640 and the read look up table 645 use a block address based search mechanism. PBAx 705 may be a physical block address of flash memory array 550 (FIG. 5) and sector valid field 710 may include a bit which may indicate whether this specific sector data is valid or not. Each entry in the write look up table 640 and read look up table 645 may point to a physical block address.

Read look up table 645 may be dedicated to read transactions while write look up table 640 may be dedicated to write transactions. To maintain block address consistency and achieve write efficiency, the write process may be segregated into two phases. Once the exact addresses are calculated from the write look up table 640, new data sectors may be written into flash memory 550 immediately and control returned to the firmware routine. If a next transaction is a read transaction, a physical block address may be looked up from the read look up table 645 if the read address is different from the last write address. In the meantime, a valid sector copy from an old block to a new block may be performed in the background to maintain data coherency.

Every time a sector-write occurs, usage information may be recorded in the physical usage table 670. Bit mapping of the physical usage table 670 is a recording of all sectors used.

Each time a sector-write occurs, an obsolete block may be put in the block copy and recycling FIFO 650. The copying process may be started when the write process is complete. The erasing and recycling processes may be started when all necessary copies are completed.

Figure 8:
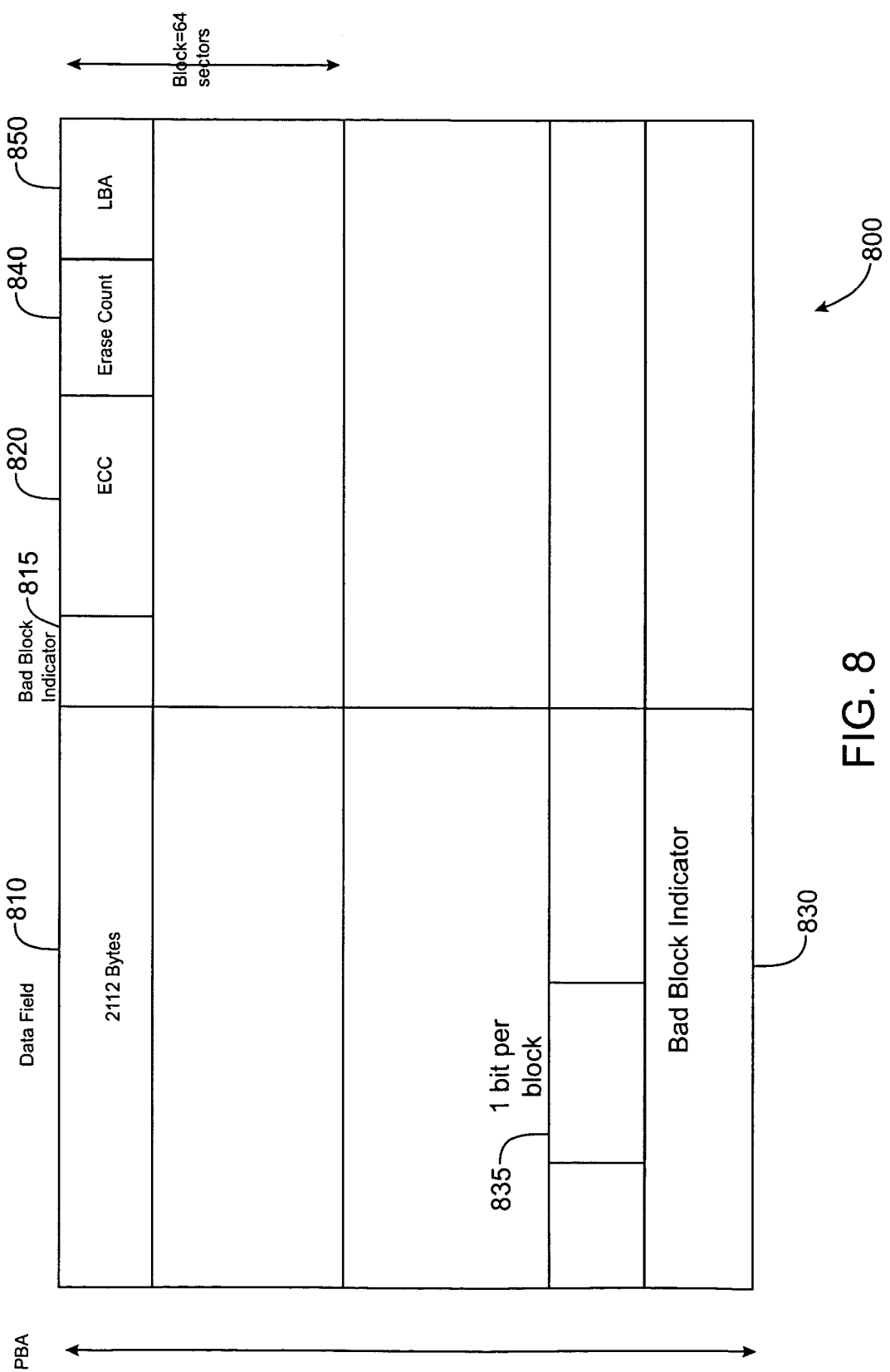
FIG. 8 is a block diagram of a peripheral flash device array data structure in accordance with the invention.

A flash memory data structure generally designated 800 is shown in FIG. 8 including a data field 810 having 512 or 2112 bytes. Spare fields may include ECC 820, bad block indicator 815, erase count 840 for each block as a life time mileage indicator, and a logical block address field 850 for system initialization. A bad block may occur when read/write sector data fails or erase block fails. A last block bookkeeping field 830 may be easier for the firmware routine to read with setting 835 as one bit per block. To maintain reliability, four copies of bad block indicators may be saved in a last block of the flash memory 550.

In accordance with the USB 2.0 protocol, host system 110 is always the command master which sends out commands through token packets. In the mass storage class, bulk-only transport is the standard which uses Reduced Block Command (RBC) of the SCSI communication protocol to read/write a target flash device. A 31 byte command format describes the read/write direction, logical block address, and transfer sector length as the sector count. The firmware routine processes the command by using the flash memory 550 as a storage medium.

Figure 9:
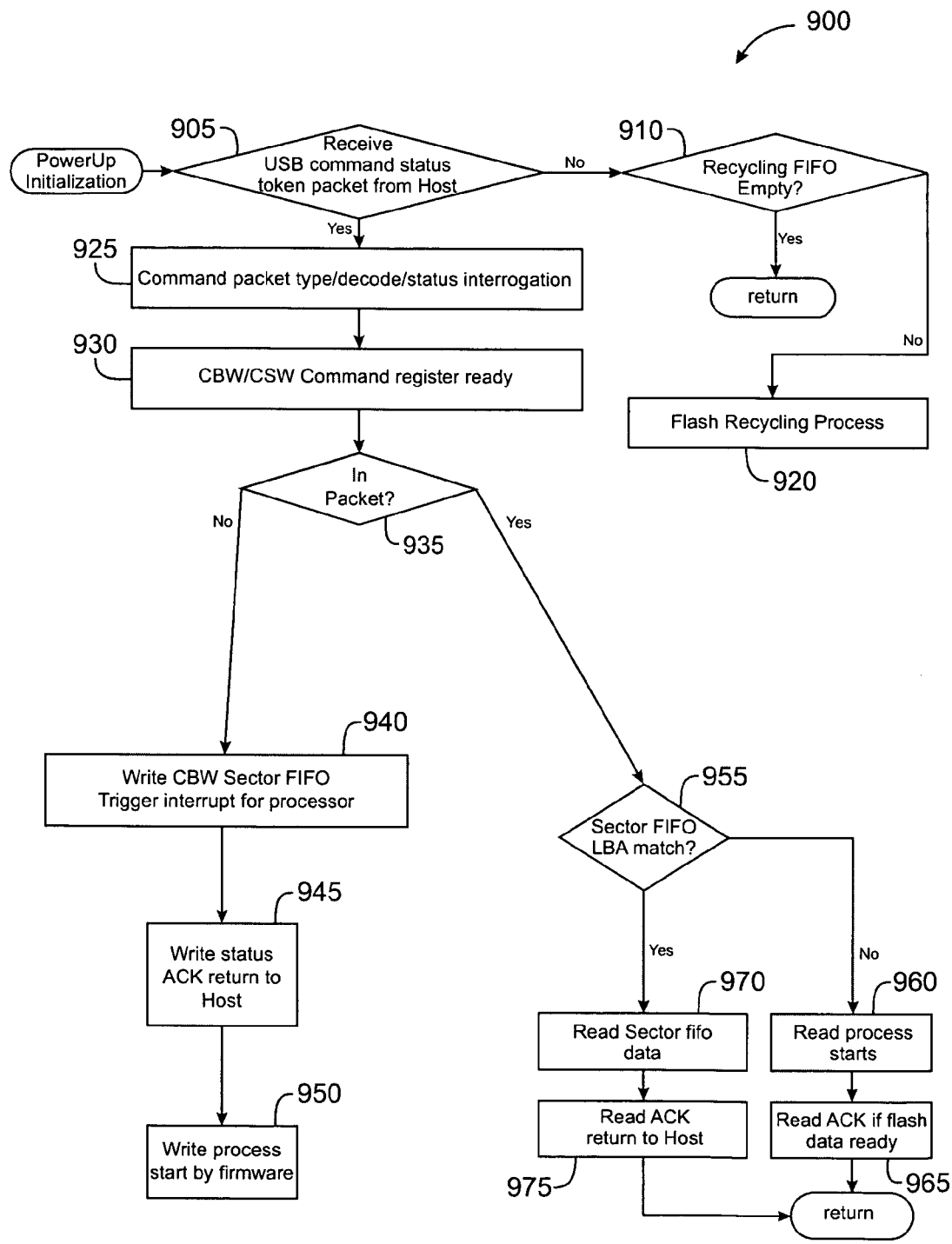
FIG. 9 is a flow chart of a firmware read/write/erase method in accordance with the invention.

A method of processing a USB command in accordance with the invention generally designated 900 is shown in FIG. 9. In step 905 receipt of a USB command/status token packet from the host system 110 may be determined. If no USB command/status token packet has been received, then in step 910 the status of the recycling FIFO 650 may be determined. If the recycling FIFO 650 is not empty, then in step 920, a flash recycling process may be performed as further described herein. If the recycling FIFO 650 is empty, the processing returns to step 905.

If a USB command/status token packet has been received, then in step 925, the packet may be processed by the serial interface engine 610 (FIG. 6). Next, in step 930 the bulk-only transport unit 615 may receive command block wrappers.

In step 935, it may be determined if the packet is an IN packet. If the packet is not an IN packet then in step 940 sector FIFO 630 is filled and an interrupt is sent to microprocessor 400. Once the write data is written to the sector FIFO 630, an ACK write status is returned to the host system 110 in step 945. In step 950 the write flash process may be started by the firmware routine.

If the packet is an IN packet then in step 955 it may be determined if the logical block address matches the LBAs in the sector FIFO 603. If the logical block address does not match, then in step 960 the read process may be started and in step 965 an ACK read status may be returned to the host system 110. If the logical block address matches, then in step 970 the sector FIFO 630 may be read and in step 975 an ACK read status returned to the host system 110. Following either of step 965 or step 975, the process may return to step 905.

Figure 10A:
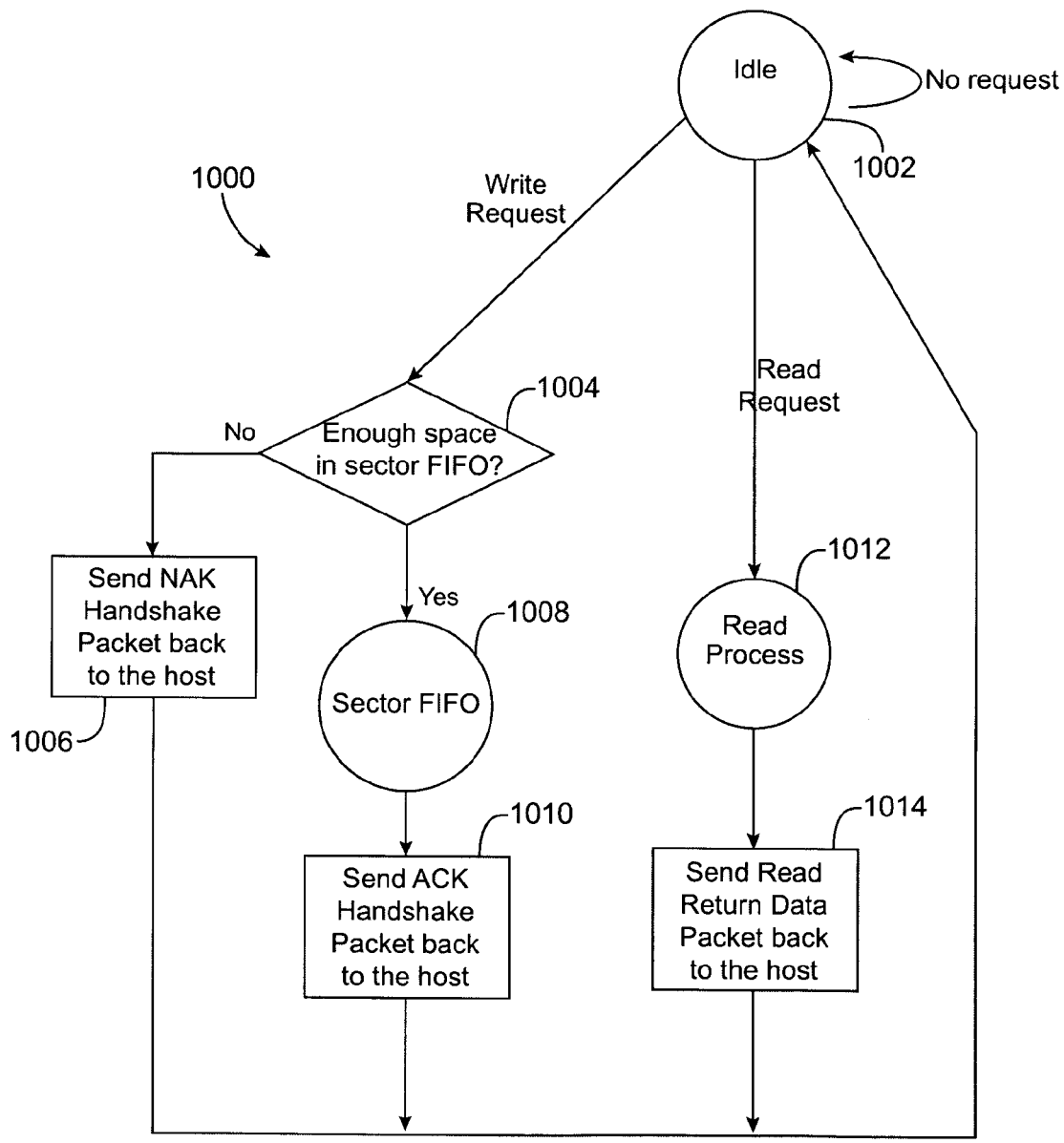
FIG. 10A is a flow chart of a main firmware service method in accordance with the invention.

A main firmware routine generally designated 1000 is shown in FIG. 10A and may include a step 1002 in which the processor 400 idles while waiting for a CBW read or write request. If a write request is received in a step 1004 it may be determined if there is enough space in the sector FIFO 630. If there is insufficient space, in a step 1006 a NAK handshake packet may be sent to the host system 110. If there is enough space, the write data may be received successfully and written to the sector FIFO 630 in a step 1008. In a step 1010 an ACK handshake packet may be sent to the host system 110 to indicate that the write data was received correctly.

If a read request is received, the read process may be executed in step 1012. In step 1014 the read data may be returned to the host system 110 in a data packet. After completion of either step 1010 or step 1014 the routine may return to step 1002.

Figure 10B:
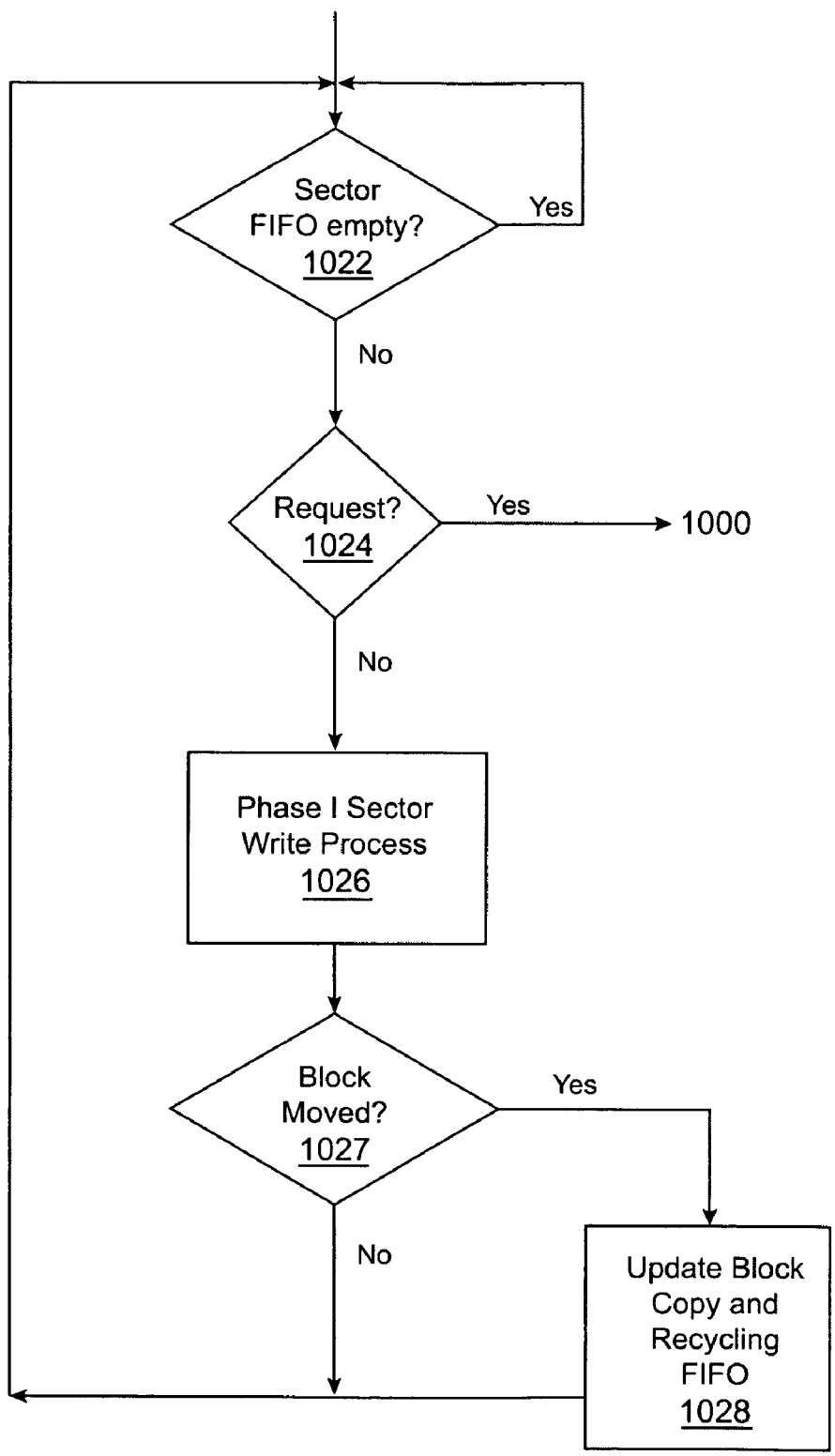
FIG. 10B is a flow chart of a phase I flash write method in accordance with the invention.

A sector write process generally designated 1020 is shown in FIG. 10B. Phase I write process 1020 may be independent of process 1000 and may have a lower priority than process 1000. In step 1022 it may be determined if the sector FIFO 630 is empty. If the sector FIFO 630 is empty, then process 1020 returns to step 1022. If the sector FIFO 630 is not empty, then in step 1024 it may be determined if a request has been received. If a request has been received the process returns to process 1000 (FIG. 10A). If no request has been received then in a step 1026 a phase I sector write process may be performed. In step 1027 it may be determined if a block has been moved. If a block has been moved, then in step 1028 the block copy and recycling FIFO is updated. Otherwise, nothing needs to be done. Phase I sector write process 1020 may include writing sector data at the top of the sector FIFO to flash memory 550. Process 1020 then returns to step 1022.

Figure 10C:
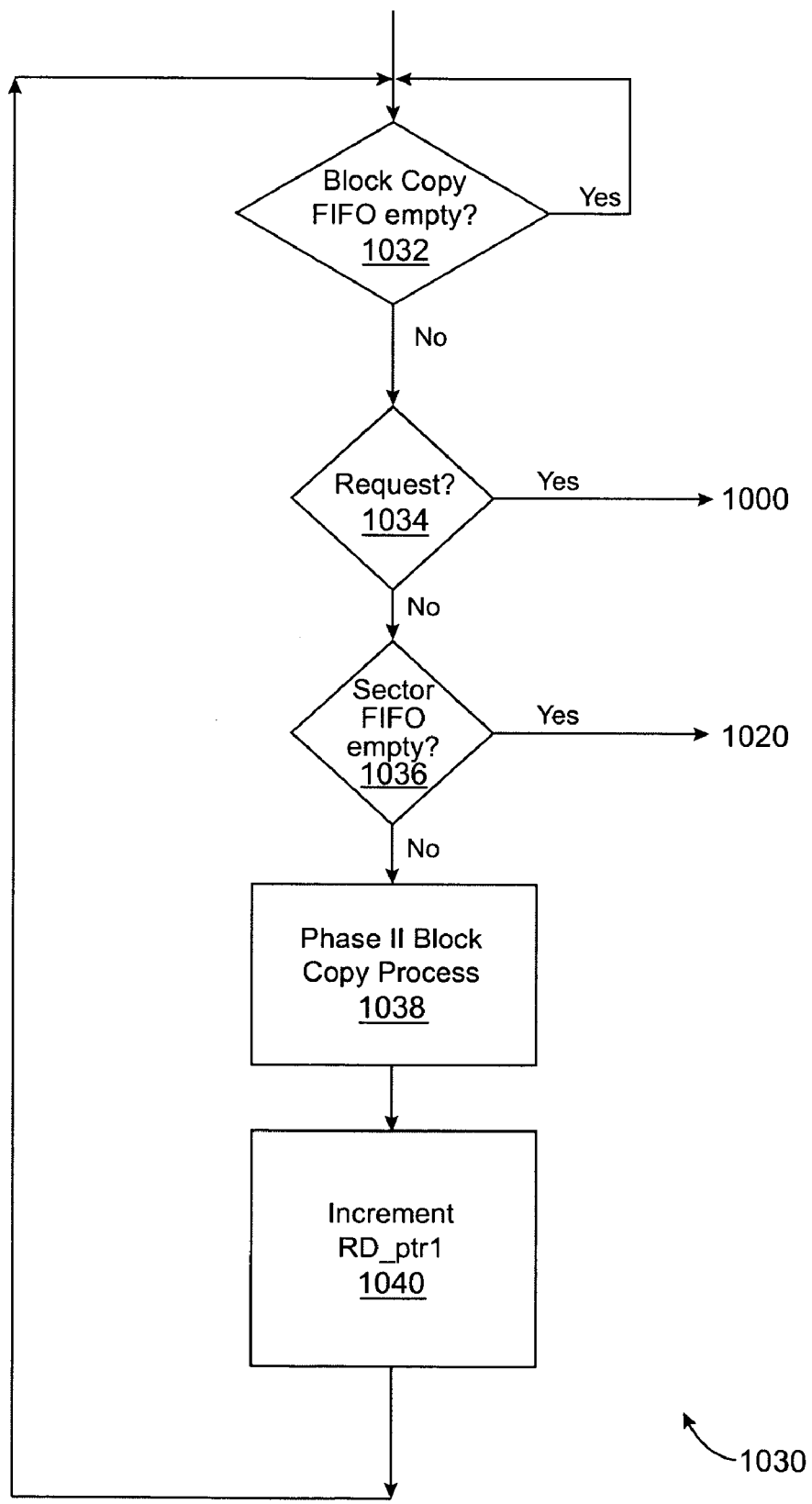
FIG. 10C is a flow chart of a phase II block copy method in accordance with the invention.

A block copy process generally designated 1030 is shown in FIG. 10C. Block copy process 1030 may be independent of process 1000 and process 1020 and may be operable to maintain data coherency. In a step 1032 it may be determined if the block copy FIFO 650 is empty. If it is empty, the process 1030 returns to step 1032. If the block copy FIFO 650 is not empty, then in step 1034 it is determined if a request has been received. If a request has been received the process returns to process 1000 (FIG. 10A). If a request has not been received, then in step 1036 it is determined if the sector FIFO 630 is empty. If the sector FIFO 630 is empty then the process 1030 may return to process 1032. If the sector FIFO 630 is not empty then a phase 11 block copy process may be performed in step 1038. In step 1040 read pointer 662 may be incremented.

Figure 10D:
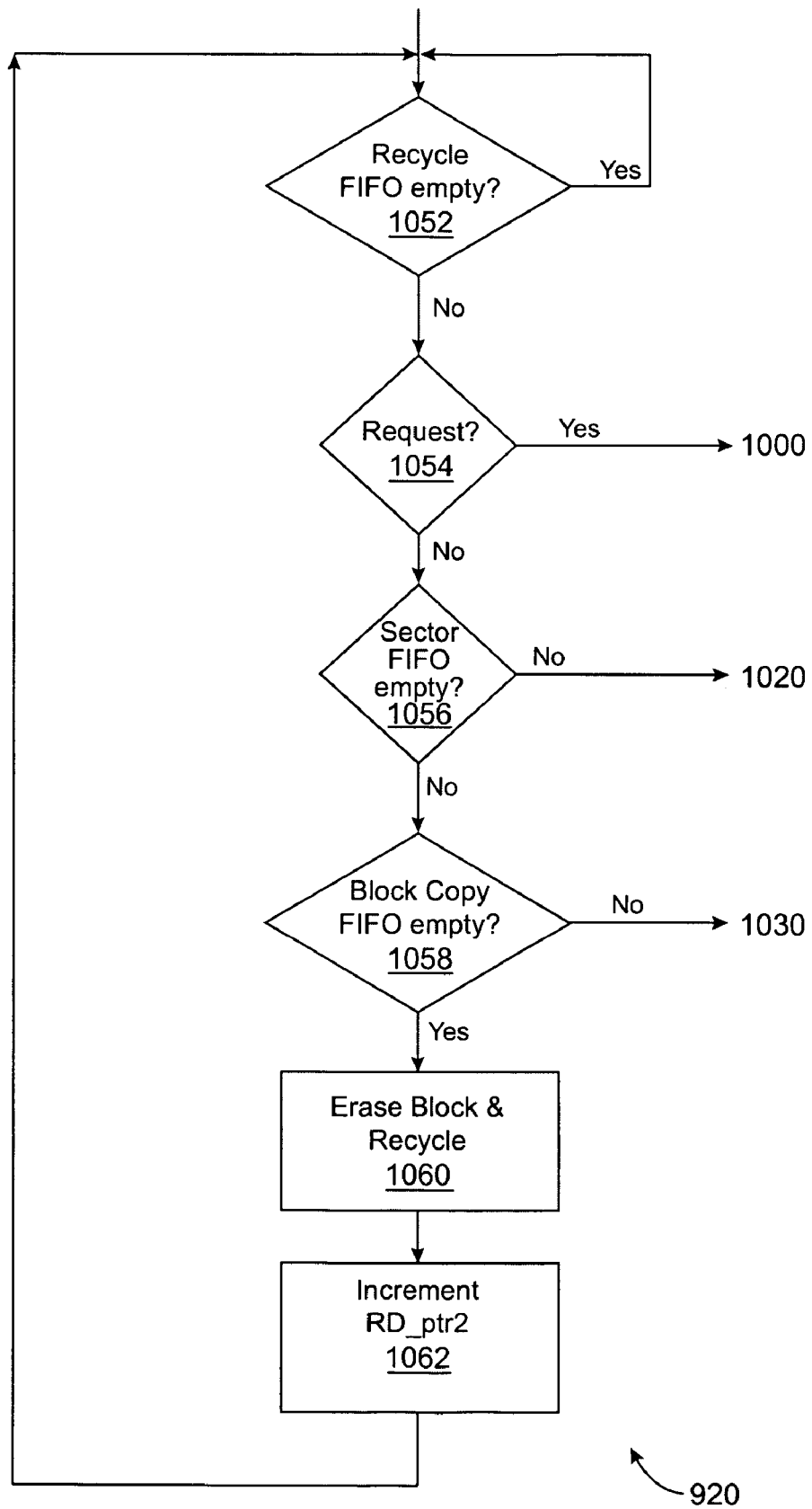
FIG. 10D is a flow chart of an erase and recycle method in accordance with the invention.

The erase and recycling process generally designated 920 is shown in FIG. 10D. Erase and recycling process 920 may be independent of processes 1000, 1020, and 1030 and may be operable to make blocks available for writing. In a step 1052 it may be determined if the recycling FIFO 650 is empty. If the recycling FIFO 650 is empty then the process 1050 returns to step 1052. If the recycling FIFO 650 is not empty then in step 1054 it is determined if a request has been received. If a request has been received the process returns to process 1000 (FIG. 10A). If a request has not been received, then in step 1056 it is determined if the sector FIFO 630 is empty. If the sector FIFO 630 is not empty, then the process 1050 may return to process 1020 (FIG. 10B). If the sector FIFO 630 is empty, then in step 1058 it may be determined if the block copy FIFO 650 is empty. If the block copy FIFO 650 is not empty, then the process 1050 may return to process 1030 (FIG. 10C). If the block copy FIFO 650 is empty, then in step 1060 an erase block and recycle process may be executed and in step 1062 the read pointer 660 may be incremented.

Figure 11A:
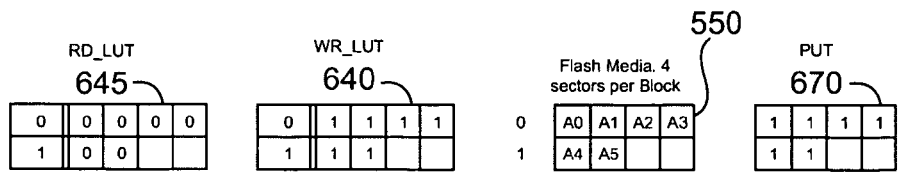
FIGS. 11A through 11F are tables showing a representative example in accordance with the invention.
Figure 11B:
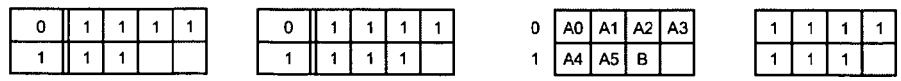
Figure 11C:
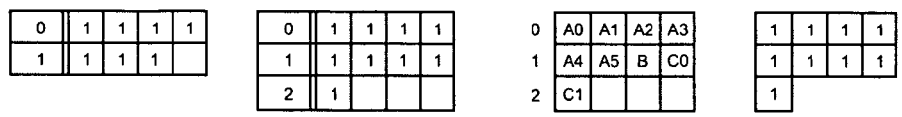
Figure 11D:
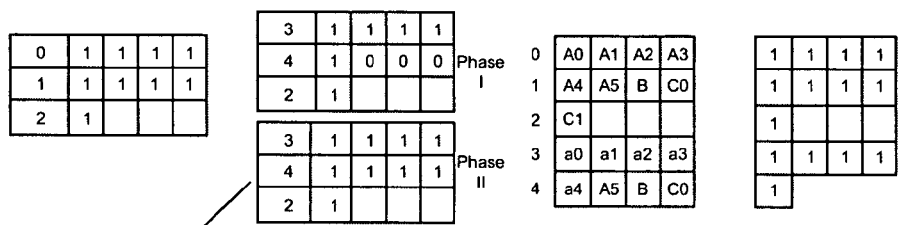
Figure 11E:
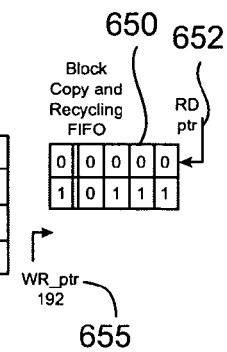
Figure 11E:
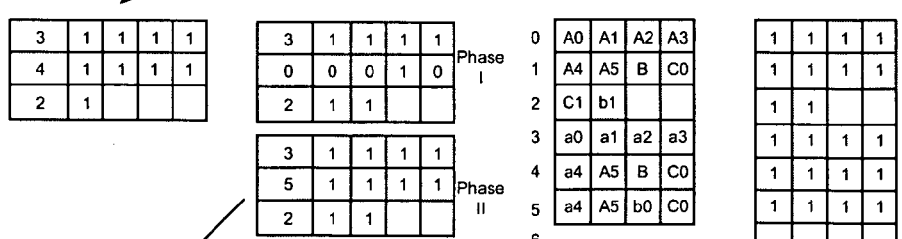
Figure 11F:
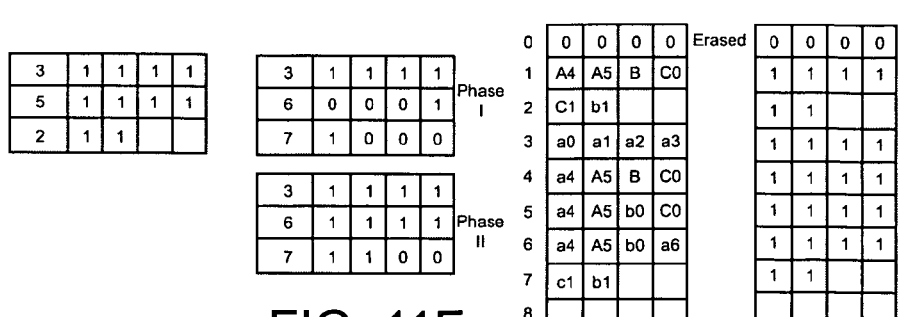

With reference to FIGS. 11A through 11F, the processes of the invention will be explained with reference to an example. Three write transactions A (FIG. 11A), B (FIG. 11B), and C (FIG. 11C) may be performed and then the written data may be updated as shown in FIGS. 11D through 11F. For purposes of illustration, flash memory 550 is shown as having four sectors per block. Translation to physical block addresses may have two SRAM for this purpose, one for read access and one for write access. The index to both SRAM may be the logical block address 700 without offset bits.

To improve the speed of the read/write process, the write process may be separated into several processes. In the sector write process 1020, write data sector may be written to flash memory 550. In the block copy process 1030, the line copy is performed in the background to maintain data coherency. After the write process is completed, the write look up table 640 and the read look up table 645 may be synchronized. Read look up table 645 may be dedicated to read access immediately after a write due to the fact that immediately after a write, sector data in the old block may not be available in the new written block.

The write process may be separated into two phases. In phase I, after the sector data is written into the new block, the write look up table 640 is updated. Phase II may be executed in the background to maintain data coherency.

With reference to FIG. 11A, write transaction A includes writing to six sectors of flash memory 550. Since flash memory is empty before the write transaction, write look up table 640 may be updated with the first physical block address (0) as it points to this particular memory block. In the meantime, the physical usage table 670 is updated to indicate which sectors are occupied. The firmware routine uses the physical usage table 670 to decide which sectors to write to.

Write transaction B is shown in FIG. 11B. Only one sector in flash memory 550 is used. Write transaction C is shown in FIG. 11C and includes writing to two sectors which cross a block boundary. Read look up table 645 may be copied from write look up table 640 for read access to synchronize read look up table 645 with write look up table 640 after both write phases are completed.

With reference to FIG. 11D, data written in write transaction A may be updated to include data written to five sectors. Since rewriting flash memory 550 requires an erase, a faster way to accomplish the update without waiting for an erase is to find a new block to write the updated data to. By checking the physical usage table 670, it may be determined that a next available empty block is physical block 3. The updated data may be written to five sectors in blocks 3 and 4. The sector count in this transaction is five and therefore continuous sector write will occur. The write look up table 640 is updated with the new physical block address 3. In physical block address 3, no line copy is required because the whole block is written by one transaction. Block 0 may be put into recycling FIFO 650 as the first block to be erased. FIFO write pointer 655 may be incremented to point to a next position.

When sector 4 of transaction A is updated, a block boundary is crossed. A 5 will not be used anymore. Transactions B and C are now on a same block. To maintain data coherency in the write look up table 640, some sectors of physical block 1 must be copied to physical block 4. Physical block 1 may be put into block copy & recycling FIFO 650 and write pointer 655 may be incremented. B and C0 may be copied to block 4. Write look up table may also be updated to physical block 4. From the point of view of flash memory 550, there is no indication that A in block 1 and 2 is no longer valid. Only the file system knows.

With reference to FIG. 11E, transaction B may be updated with two sectors. First, new data b0 is written into physical block 5. Then, the other sectors of physical block 4 may be copied to block 5. Write look up table 645 second entry may be updated to 5 to reflect the new changes. Block 4 may be put into recycling FIFO 650 for erasure. After b0 is written, b1 is written into physical block 2. Write pointer 655 may be incremented to point to the next position.

With reference to FIG. 11F, transaction C may be updated with a same number of sectors. By checking the write look up table 645, it is known that block 5 has part of transaction C. Block 5 may be copied to block 6 with the updated transaction. Since C1 is in block 2, block 2 needs to be in block 7. Blocks 5 and 2 may be put in recycling FIFO 650 for erasure. After block 0 is erased, read pointer 662 may be incremented. Physical usage table 670 may be cleared for use.

Figure 12:
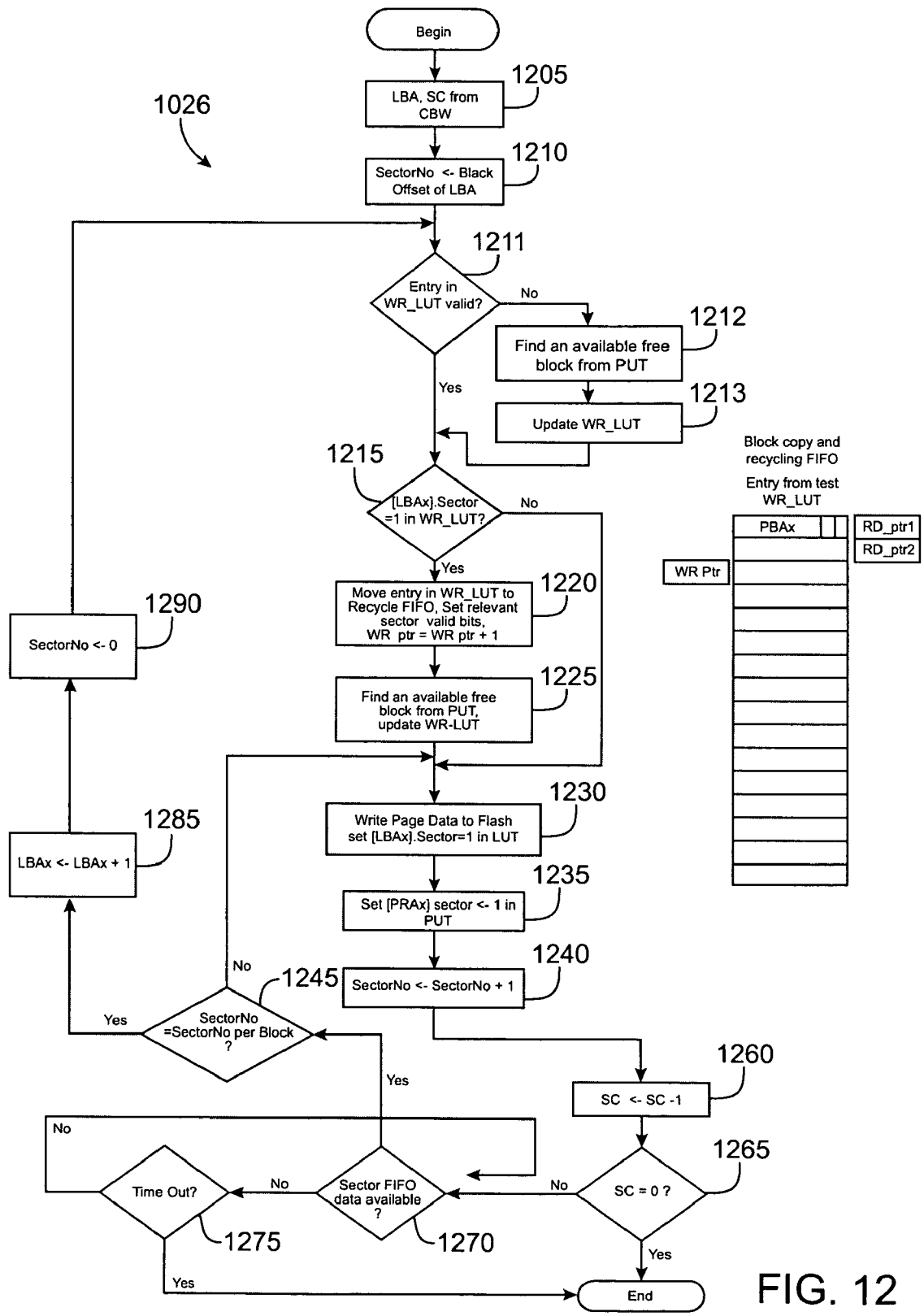
FIG. 12 is a detailed flow chart of a write sector method in accordance with the invention.

Logical block address (LBA) and sector count may be recorded from command block wrappers (CBW). Whenever sector FIFO 630 is not empty, an interrupt 635 may be sent to processor 400. Inside the interrupt service routine, write sector process 1026 may be executed. The algorithm always handles one sector at a time. Sector count is decremented whenever a sector is written into flash. When the sector count equals zero, process 1026 is complete. To achieve higher performance and maintain data coherency, the flash write process may be divided into two phases. Phase I write sector process generally designated 1026 is shown in FIG. 12. Phase I write sector process 1026 may write a received sector data to available flash memory 550. To maintain data coherency, valid data sectors in an old physical block may be copied to a new block pointed to by the updated write look up table 640.

A block copy FIFO may be dedicated for this purpose. Old write look up table 640 entries may be put into block copy FIFO for background operation. Both write look up table 640 and read look up table 645 may be synchronous and identical when phase II write process is complete. Priority is given first to demand write, then to background copy and then to erase and recycling.

Phase I write sector process 1026 may include a step 1205 in which logical block address and sector count are loaded from the incoming CBW. In a step 1210 block offset bits may be used as the sector number. LBAx is the block address used as an index to the write look up table 640 to look through for a corresponding physical block address. As an example, if LBA is 0010,0101 and the number of sectors in a block is 16, then 0010 will be the LBAx for the entry pointer of both the write look up table 640 and the read look up table 645. Since at power up all initial SRAM contents are unknown, firmware may search through flash spare LBA field to rebuild both the write look up table 640 and the read look up table 645.

In step 1211, the LBA may be used to find the corresponding entry in the write look up table 640. Then the valid bit for the PBA field may be examined (not shown). If the PBA field is not valid, then in step 1212 an available free block may be found in physical usage table 670. In step 1213 the physical address of the available free block may be used to update the PBA field of the write look up table 640 entry.

Following step 1213 or step 1211 in the case where the PBA field is valid, in step 1215 a sector valid field in the write look up table 640 is checked. If the sector valid field bit is set to one, then old data exists in the sector and a new free block must be used and the old block moved to the block copy and recycling FIFO 650 in step 1220. When moving to the block copy and recycling FIFO 650 the physical block address may be directly copied. The sector bits may require some tweaking. The sector valid bits for all new write sectors may be cleared. All other sector valid bits may remain the same. In step 1225 an available free block may be found from the physical usage table 670. In the case where the sector valid field is set to zero, the sector is free to be used and process 1026 may proceed to step 1230.

In step 1230 sector data may be written into flash memory 550. Additionally, the sector valid field bit may be set to one in the write look up table 640. In step 1235 the physical block address sector bit may be set to one in the physical usage table 670. In step 1240 the sector number may be incremented to continue the process 1026. During the erase and recycle process 920, the block pointed to by read pointer 660 may be erased and the physical usage table cleared accordingly. This indicates that the block is available to be used again.

In step 1260 the sector count may be decremented and in step 1265 it may be determined if the sector count is zero. If the sector count is zero the process 1026 ends. Otherwise, the write data availability may be checked in sector FIFO 630 in step 1270. If no write data is available then it may be determined if the process 1026 has timed out in step 1275. If the process 1026 has timed out, then an error has occurred and the process 1026 ends. If the process 1026 has not timed out, then processing returns to step 1270.

In step 1245 the current sector number is checked against a total sector number per block. If they are not equal, meaning that the end of the block has not been reached, then process 1026 returns to step 1230 to write a next sector data. If they are equal, meaning that the end of the block has been reached, in step 1285 the LBAx field may be incremented when a flash block boundary is reached. In step 1290 the sector number may be cycled back to sector number zero and processing returned to step 1211.

Figure 13:
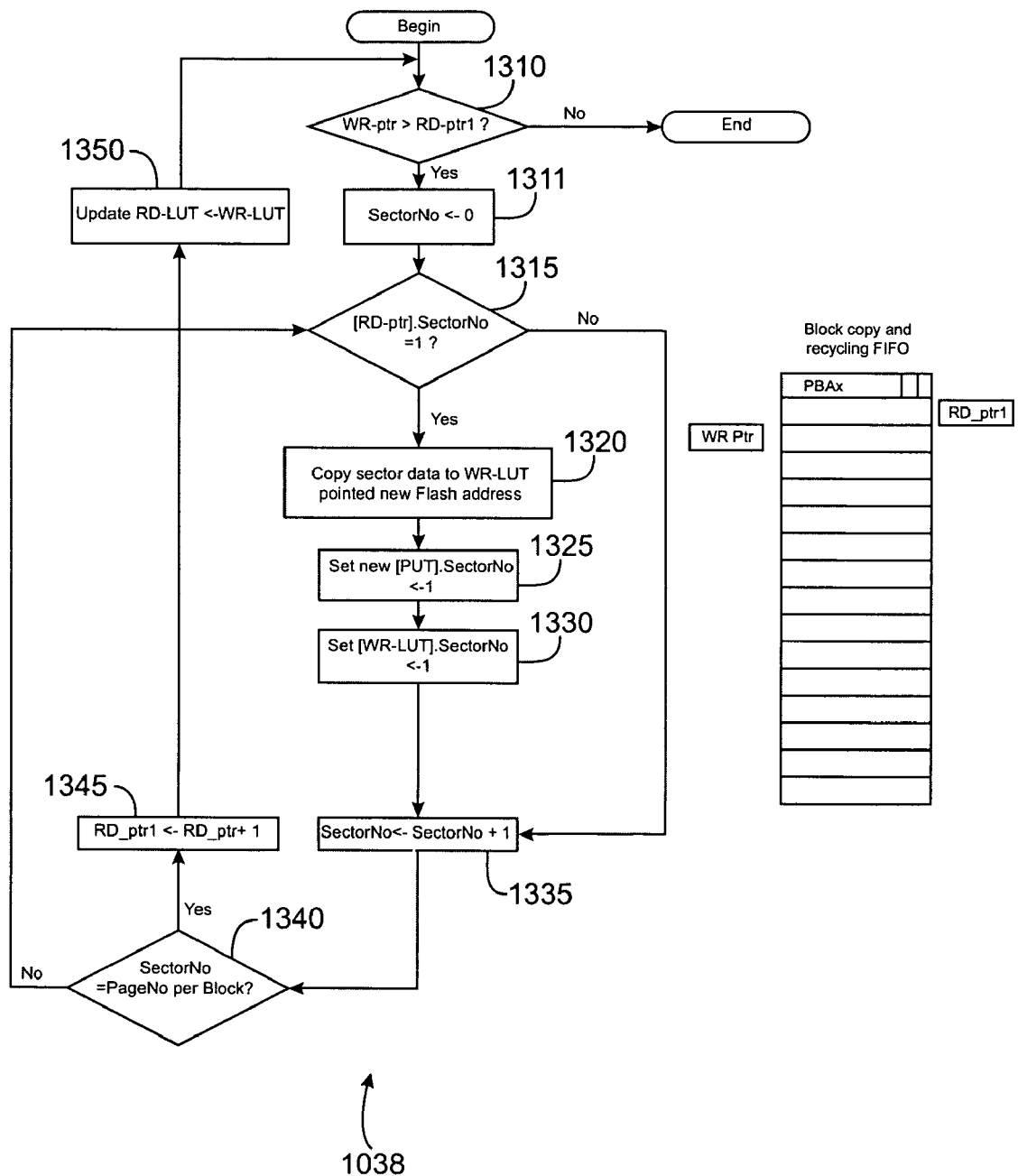
FIG. 13 is a detailed flow chart of a phase II background sector copy method in accordance with the invention.

The phase II block copy process 1038 is shown in FIG. 13 and may be done in the background whenever the block copy FIFO 650 is not empty. Block copy FIFO 650 may be determined to be not empty by comparing pointer values of write pointer 655 and read pointer 662 in step 1310. If the value of write pointer 655 is not greater than the value of read pointer 662 then the process 1300 ends. The sector valid field from FIFO entry pointed to by read pointer 662 may indicate valid sectors that need to be copied to the new physical block address for data consistency. The sector number may be set to zero in step 1311. A determination in step 1315 may be made whether a current sector must be copied or not. If it must be copied, it may be copied in step 1320. A location of this sector in the physical usage table 670 may be set in step 1325 for the new physical address entry. The location in the write look up table 640 may be set in step 1330 and a sector offset number incremented in step 1335. If the current sector must not be copied, then process 1300 proceeds to step 1335.

Sector copy may be determined to be complete when the sector number reaches the block boundary in step 1340. If sector copy is complete read pointer 662 may be incremented in step 1345 and the PBA entry in the read look up table 640 is updated with the PBA entry in the write look up table 645 in step 1350. Processing then returns to step 1310. If sector copy is not complete, processing returns to step 1315.

Figure 14:
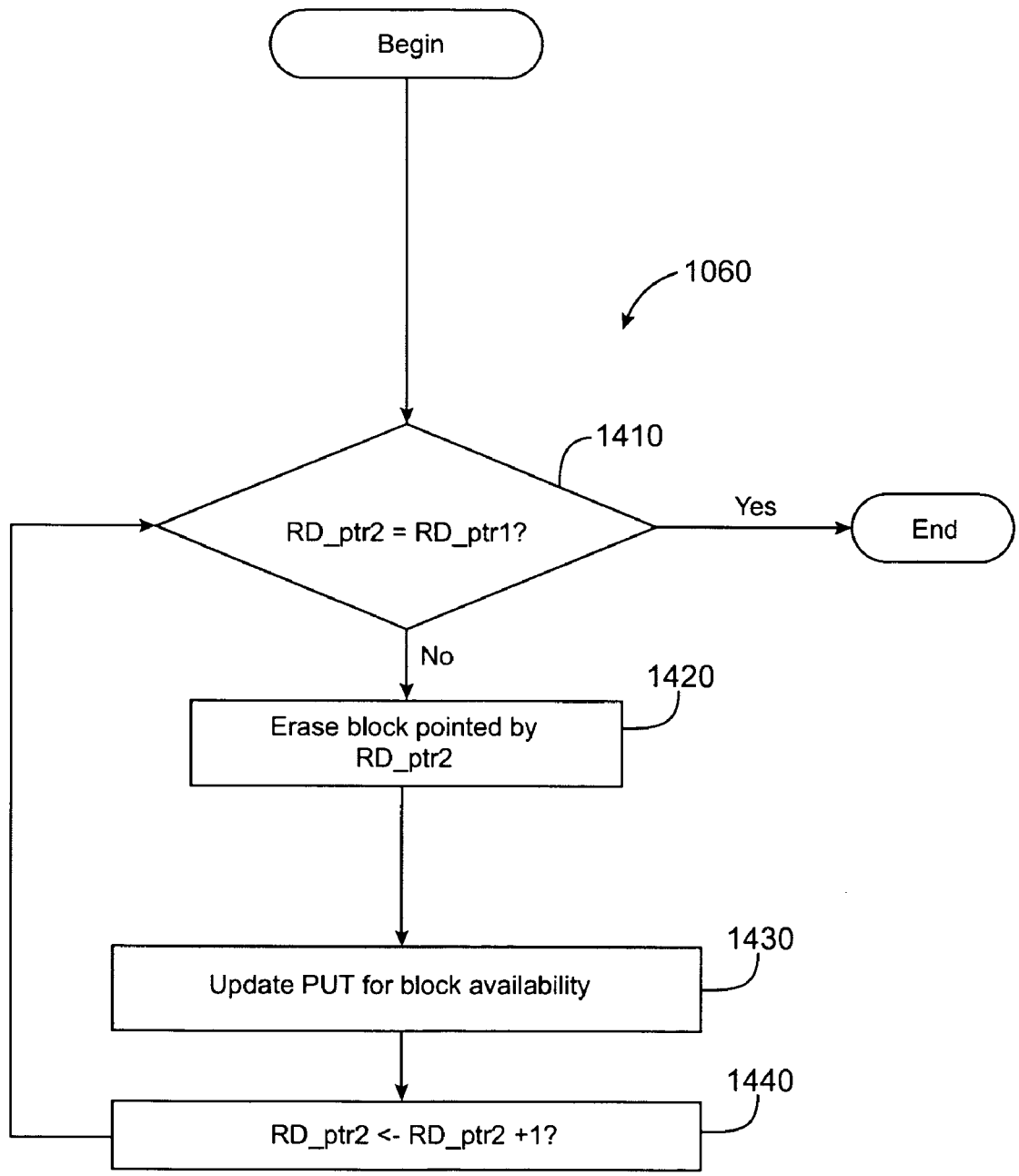
FIG. 14 is a flow chart of an erase and recycle method in accordance with the invention.

The erase block and recycle process 1060 is shown in FIG. 14. In step 1410 read pointers 660 and 662 may be compared. If they are equal the process 1400 ends. If they are not equal, a physical block pointed to by read pointer 660 may be erased. Firmware may read out the physical block address pointed to by read pointer 660 and the physical block erased in step 1420. In step 1430 a corresponding physical usage table 670 entry may be cleared to zero to indicate that the physical block is free to be used again. Read pointer 660 may be incremented for a next background recycling operation in a step 1440.

Figure 15:
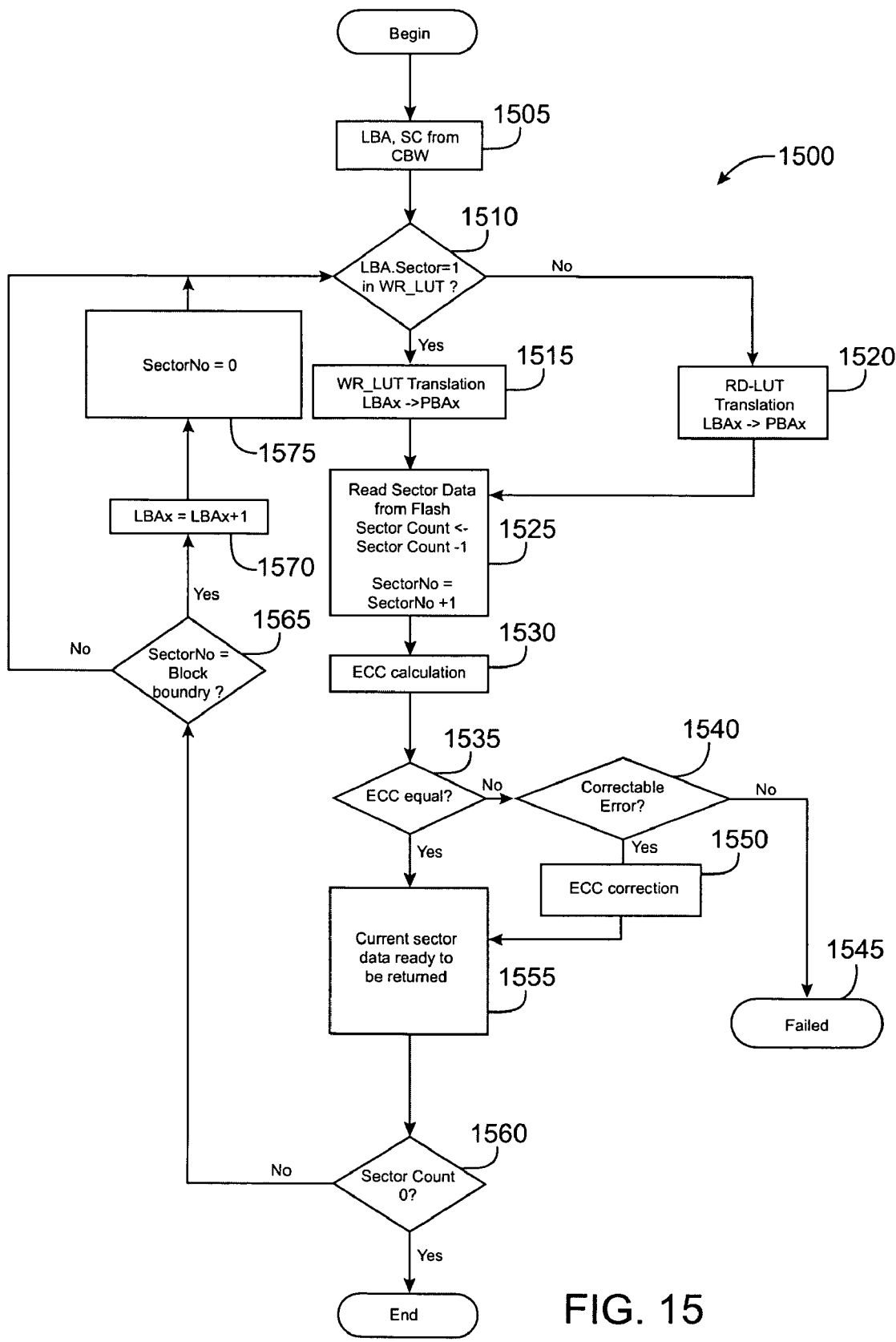
FIG. 15 is a flow chart of a read method in accordance with the invention.

A read process generally designated 1500 is shown in FIG. 15. Read process 1500 may be performed by firmware once a CBW is received and recognized as a read command. In step 1505 the logical block address register 625 and the sector count register may be loaded from the CBW. The write pointer look up table 640 may be accessed first by using the logical block address as an index. The offset of the logical block address may be used to index into the corresponding entry to see if the sector is available in the physical block or not, in step 1510. If the block has already been moved to a new location, the sectors that need to be copied over may not have been copied yet because the copying process may be done in the background, which will take some amount of time.

If the sector is available, then in step 1515 the write look up table 640 may be used to translate logical block addresses to physical block addresses. If the sector is not available, the physical block address in the write look up table 640 is a new block and the old data is still in the old block, which is still pointed to by the entry in read look up table 645. In this case, read look up table 645 is used to translate the logical block address to the physical block address in step 1520.

Read process 1500 immediately after writing has a higher priority than the phase II block copy process 1038 in order to have better system performance and read response time.

After translation, the resultant physical address may be used to read data from flash memory 550, the sector count decremented and the sector number incremented in step 1525. In step 1530 the ECC may be calculated from the read sector data and in step 1535 the calculated ECC may be compared with a stored ECC. If they are not equal, then further analysis may be performed to determine if the error is correctable in step 1540. If not correctable, the process 1500 fails in step 1545. If correctible, then an ECC correction process is executed in step 1550.

In step 1555 the current sector data may be ready to be returned to host 110. In step 1560 it may be determined if the sector count is equal to zero. If sector count equals zero then process 1500 ends. In step 1565 the block boundary may be checked. If the block boundary has been reached, the logical block address may be incremented in step 1570 and the offset bits set to zero is step 1575. Since CBW only has a starting address, all intermediate addresses will be generated internally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A memory flash card reader for writing to and reading from a memory flash card comprising:
    a processor for receiving at least one request from a host system;
    an index comprising information regarding sectors of the memory flash card wherein the processor may utilize the index to determine sectors of the memory flash card that are available for writing, erasing and reading, the index further comprising a write look up, table, a read look up table and a physical usage table;
    a block copy and recycling first-in-first-out unit (FIFO); and
    at least one card controller coupled to the processor.

2. The memory flash card reader of claim 1, wherein the at least one request comprises a logical block address for reading or writing and wherein the index maps the logical block address to a physical block address in the memory flash card.

3. The memory flash card reader of claim 1, wherein the processor is operable to recycle obsolete blocks from the FIFO in the background with respect to the host system to free up resources of the host system.

4. The memory flash card reader of claim 1, wherein the processor is operable to recycle obsolete blocks from the FIFO after a block sector copy process.

5. The memory flash card reader of claim 1, further comprising a Universal Serial Bus interface to the host system.

6. The memory flash card reader of claim 1, wherein the processor is operable to communicate with the host system using a Bulk Only Transport protocol.

7. The memory flash card reader of claim 1, wherein the processor is operable to communicate with the host system using the SCSI transparent command set protocol.

8. The memory flash card reader of claim 1, wherein the processor is operable to communicate with the host system using the Reduced Block Command T10 Project 240-D protocol.

9. The memory flash card reader of claim 1, wherein the memory flash card functions as a floppy disk.

10. The memory flash card reader of claim 1, wherein the memory flash card reader can be applied to USB and ExpressCard plug and receptacle systems.

11. The memory flash card reader of claim 1, wherein the at least one card controller comprises a USB controller.

12. The memory flash card reader of claim 1, wherein the at least one card controller comprises a Secure Digital controller.

13. The memory flash card reader of claim 1, wherein the at least one card controller comprises a MultiMediaCard controller.

14. The memory flash card reader of claim 1, wherein the at least one card controller comprises a Memory Stick controller.

15. The memory flash card reader of claim 1, wherein the at least one card controller comprises a Compact Flash controller.

16. The flash memory card reader of claim 1, wherein the processor, index and at least one card controller are housed in a box coupled to the host system by a cable.

17. The flash memory card reader of claim 1, wherein the processor, index and at least one card controller are housed in the host system.

18. A method of managing a flash memory comprising the steps of:
- receiving at least one request from a host system in a processor within a flash memory controller;
- determining which sectors of the flash memory are available for writing, erasing and reading utilizing the processor and an index coupled to the processor, the index comprising a write look up table, a read look up table and a physical usage table;
- recycling obsolete blocks copy and recycling first-in-first-out unit (FIFO) after a block sector copy process; and
- writing, erasing and reading to a flash memory card through at least one card controller coupled to the processor.

19. The method of managing a flash memory of claim 18, wherein determining which sectors of the flash memory are available for writing, erasing and reading comprises mapping a logical block address provided in the at least one request from the host system to a physical block address in the flash memory card utilizing the index.

20. The method of managing a flash memory of claim 18, wherein the recycling of obsolete blocks occurs in the background with respect to the host system to free up resources of the host system.

21. The method of managing a flash memory of claim 18, wherein the recycling of obsolete blocks occurs after a block sector copy of valid data from sectors of a first block to sectors of a second block, the first block becoming an obsolete block, and wherein the sectors of the first block are erased.

22. The method of managing a flash memory of claim 18, wherein the flash memory controller is coupled to the host system by a Universal Serial Bus interface.

23. The method of managing a flash memory of claim 18, wherein the processor is operable to communicate with the host system using a Bulk Only Transport protocol.

24. The method of managing a flash memory of claim 18, wherein the processor is operable to communicate with the host system using the SCSI transparent command set protocol.

25. The method of managing a flash memory of claim 18, wherein the processor is operable to communicate with the host system using the Reduced Block Command T10 Project 240-D protocol.

26. The method of managing a flash memory of claim 18, wherein the memory flash card functions as a floppy disk.

27. The method of managing a flash memory of claim 18, wherein the memory flash card reader can be applied to USB and ExpressCard plug and receptacle systems.

28. The method of managing a flash memory of claim 18, wherein the at least one card controller comprises a USB controller.

29. The method of managing a flash memory of claim 18, wherein the at least one card controller comprises a Secure Digital controller.

30. The method of managing a flash memory of claim 18, wherein the at least one card controller comprises a Multi-MediaCard controller.

31. The method of managing a flash memory of claim 18, wherein the at least one card controller comprises a Memory Stick controller.

32. The method of managing a flash memory of claim 18, wherein the at least one card controller comprises a Compact Flash controller.

* * * * *